UNITED STATES PATENT OFFICE 2,609,399

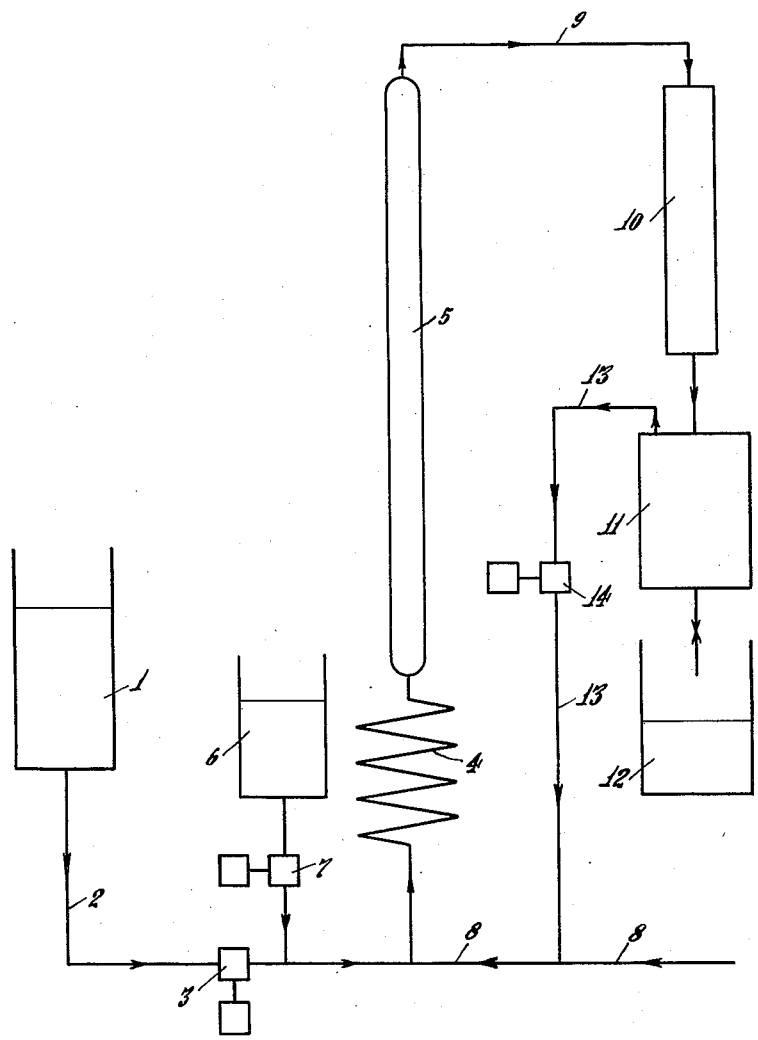

PROCESS FOR THE HYDROLYTIC HYDROGENATION OF CARBOHYDRATES IN AN ACID MEDIUM

Cornelis Martinus Hendrik Kool, Haren, and Hendrik Adriaan van Westen and Lenze Hartstra, Amsterdam, Netherlands, assignors to Naamlooze Vennootschap W. A. Scholten's Chemische Fabrieken, Groningen, Netherlands, a corporation of the Netherlands Application December 30, 1947, Serial No. 794,574
In the Netherlands September 30, 1943

7 Claims. (Cl. 260—635)

The invention relates to a process for the hydrolytic hydrogenation of carbohydrates in an acid medium, e. g. for the hydrolytic hydrogenation of starch, dextrin and maltose to sorbitol and of saccharose to sorbitol and mannitol etc.

It is known that the hydrolytic hydrogenation of carbohydrates is promoted by using an acid medium.

When carrying out the said process on an industrial scale it is practically necessary to use metal apparatus, since the hydrolytic hydrogenation of carbohydrates as a rule is carried out in closed reaction chambers at temperatures above 100° C., i. e. under pressure. As the metal used must also be resistant to acid, the choice of the material is a very limited one. Apparatus made of chromium nickel steel for instance is suitable for the purpose.

In the installations hitherto used it was desirable, particularly in the case of a continuous hydrolytic hydrogenation process, to manufacture not only the reaction chambers, but also other parts of the installation, such as the mixing or feeding vessels, the feed pumps and the feeding lines, of a metal which is resistant to acids.

The invention relates to a process for the hydrolytic hydrogenation of carbohydrates, which is characterized in that the acid reaction required for the conversion of the reaction mixture is obtained by the addition of a substance, having a substantially neutral reaction at normal temperature, but which, at the temperature required for the reaction, will produce the acid medium required.

When carrying out this process, it will be sufficient that only those parts of the installation which are subjected to high temperatures, consist of an acid resisting material. This is chiefly the case with the reaction chambers and, if they are used, the pre-heating and cooling devices, which will get into touch with the hot products.

The following are examples of substances having a neutral reaction at normal temperature, but producing an acid medium at higher temperatures:

1. Substances with adsorbing properties which have been treated with an organic or an inorganic acid and from which the acid has been subsequently removed, e. g. by washing with water, to such a degree that at normal temperature they will in an aqueous medium present a neutral reaction, but will yield acid at higher temperatures. This phenomenon is shown by various fuller's earths, diatomaceous earths, active carbons, synthetic resins and the like.

2. Substances which will present a neutral reaction at normal temperature, but which at elevated temperatures will hydrolyse in an aqueous medium to substances, having an acid reaction. Examples of such substances are salts of sulphuric acid esters obtained from alkenes or alcohols, such as sodium hexylsulphate. Another substance which may be used is antimonous oxychloride, SbOCl.

The amount of the substance or mixture of substances to be added according to the invention depends on the degree of acidity produced by the said substances under the reaction conditions and also, of course, on the nature of the material to be hydrolytically hydrogenated.

The hydrolytic hydrogenation is generally carried out at temperatures above approximately 150° C. The acid concentration must not be too high, in order to prevent as much as possible deterioration of the hydrogenation catalyst.

For the hydrolytic hydrogenation of starch or of decomposition products thereof to sorbitol, the method according to the invention moreover has the advantage, that secondary reactions by which other substances than sorbitol are produced, will be prevented; at the same time the conversion will proceed much more rapidly than without using substances generating an acid medium.

The drawing shows an apparatus suitable for the process according to the invention.

The liquid to be hydrogenated is transported by means of the feedpump 3 from storing tank 1 through line 2 to the preheater 4 and then to the reaction chamber 5. Before the liquid is introduced into the preheater it is mixed with the catalyst paste coming from tank 6 and press 7, while at the same time hydrogen is introduced through line 8. The liquid gas mixture leaving the reaction chamber at the upper end flows through line 9 to cooler 10 and from there to a separator 11, in which the liquid and the non reacted hydrogen are separated. The hydrogenized liquid flows into the collecting tank 12; the hydrogen is reintroduced through line 13 by means of the gas circulation pump 14.

The invention will be explained by the following example:

Example

To a suspension of potato starch of 30% there were added 6% (calculated on the dry material) of an alkali-free nickel-kieselguhr-catalyst and 0.15% of a substance generating phosphoric acid at an elevated temperature. The said substance generating phosphoric acid had been obtained by mixing 1 part by weight of diatomaceous earth; 1 part by weight of phosphoric acid (calculated as anhydrous acid) and 3 parts by weight of water, evaporating the mixture until dry, heating the residue for 3 hours at a temperature of 450° C., pulverizing the preparation thus obtained, washing the pulverized material with water until it shows a neutral reaction and finally drying the same. The dry product contained about 25% of $H_3PO_4$.

The suspension of potato starch, catalyst and acid producing substance was continuously pumped through a reaction chamber consisting of a plurality of vertical tubes connected in series. Hydrogen was pumped into the lower part of the first tube under a pressure of 150 kg./cm.$^2$. The quantity of hydrogen used amounted to 20 volumes (at a pressure of 150 kgs./cm.$^2$) on one volume of the suspension.

In the first reaction tube the temperature of the reaction mass was gradually raised to 190–200° C. and was maintained at that value in the subsequent reaction tubes. The reaction product was filtered in order to eliminate the catalyst. It contained 99% of sorbitol and 1% of dextrin (calculated on dry material).

A similar result will be obtained, when using instead of the substance generating phosphoric acid, sodium hexyl sulphate in a proportion of about 0.1%.

We claim:

1. A process of manufacturing polyhydric alcohols substantially consisting of sorbitol by the hydrolytic hydrogenation of polysaccharides, which comprises producing a neutral mixture of a polysaccharide of the group consisting of starch, modified starches, dextrin and maltose, water and a latent acid generating substance which at ordinary temperature presents a neutral reaction but at the temperature of the hydrolytic hydrogenation will hydrolyze in an aqueous medium to provide an acid reaction, and contacting said mixture with hydrogen and a hydrogenating catalyst at superatmospheric pressure and at a temperature above about 150° C., but not exceeding about 200° C.

2. A process as described in claim 1 in which the latent acid generating substance is a salt of a sulphuric acid ester obtained from an alkene.

3. A process as described in claim 1 in which the latent acid generating substance is a salt of a sulphuric acid ester obtained from an alcohol.

4. A process as described in claim 1 in which the latent acid generating substance is antimonous oxychloride.

5. A process of manufacturing polyhydric alcohols substantially consisting of sorbitol by the hydrolytical hydrogenation of starch, which comprises producing a neutral mixture of starch, water and a latent acid generating substance which at ordinary temperature presents a neutral reaction, but at the temperature of the hydrolytic hydrogenation will hydrolyze in an aqueous medium to substances having an acid reaction, and contacting said mixture at a temperature of about 190–200° C. with hydrogen and a hydrogenating catalyst at superatmospheric pressure.

6. A process of manufacturing polyhydric alcohols substantially consisting of sorbitol by the continuous hydrolytic hydrogenation of polysaccharides, which comprises producing a neutral mixture of a polysaccharide of the group consisting of starch, modified starches, dextrin and maltose, water and a latent acid generating substance which at ordinary temperature presents a neutral reaction but at the temperature of the hydrolytic hydrogenation will hydrolyze in an aqueous medium to substances having an acid reaction, and continuously contacting said mixture with hydrogen and a hydrogenating catalyst at superatmospheric pressure and at a temperature above about 150° C., but not exceeding about 200° C.

7. A process of manufacturing polyhydric alcohols substantially consisting of sorbitol by the continuous hydrolytic hydrogenation of starch, which comprises producing a neutral mixture of starch, water and a latent acid generating substance which at ordinary temperature presents a neutral reaction, but at the temperature of the hydrolytic hydrogenation will hydrolyze in an aqueous medium to substances having an acid reaction, and continuously contacting said mixture at a temperature of about 190–200° C. with hydrogen and a hydrogenating catalyst at superatmospheric pressure.

CORNELIS MARTINUS HENDRIK KOOL.
HENDRIK ADRIAAN van WESTEN.
LENZE HARTSTRA.

REFERENCES CITED

The following references are of record in the file of this patent:

UNITED STATES PATENTS

| Number | Name | Date |
| --- | --- | --- |
| 269,779 | Endemann | Dec. 26, 1882 |
| 536,260 | Bloede | Mar. 26, 1895 |
| 2,292,293 | Rose | Aug. 4, 1942 |
| 2,335,731 | Bottoms | Nov. 30, 1943 |
| 2,518,235 | Hartstra et al. | Aug. 8, 1950 |

OTHER REFERENCES

Englis et al.: Ind. and Eng. Chem., vol. 34, No. 7, July 1942, pp. 864–67.

Sussman: Ind. and Eng. Chem., December 1946, pp. 1228–30.